Sept. 20, 1949.  B. S. CARRUTH  2,482,318
POWER OPERATED CRADLE
Filed Nov. 5, 1945
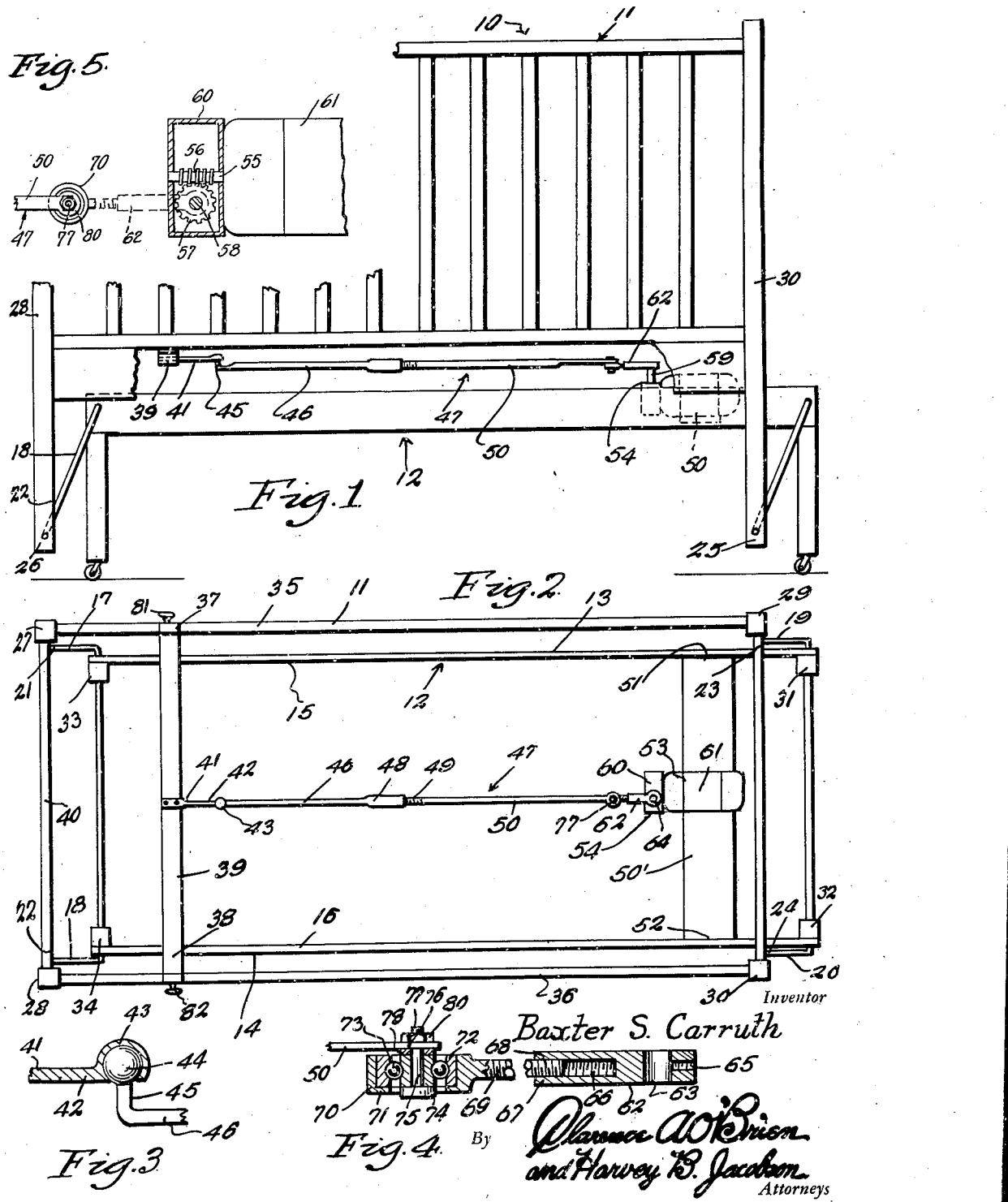
Inventor
Baxter S. Carruth
By Clarence A. O'Brien
and Harvey B. Jacobson
Attorneys Patented Sept. 20, 1949

2,482,318

UNITED STATES PATENT OFFICE 2,482,318

POWER-OPERATED CRADLE

Baxter S. Carruth, El Paso, Tex.

Application November 5, 1945, Serial No. 626,819

1 Claim. (Cl. 5—109)

My invention as described herein, and illustrated in the accompanying drawings, consists of an infant's cradle, an object of which is to provide a power driven cradle.

Another object of my invention is to provide a cradle having longitudinal motion.

A further object of this invention is to provide a non-tilting cradle.

Another object of my invention is to provide a cradle suspended from a supporting frame and means whereby the cradle will move back and forth upon a horizontal plane throughout its movement.

A primary object of my invention is the provision of means for a cradle so hung and power operated as to induce relaxation and sleep without any resulting deleterious effects upon an infant and which is superior in effect to the rocking motion of the common cradle according to statement of physicians.

A still further object of the invention is the provision of means whereby a cradle with back and forth, up and down horizontal movement is provided.

Other features and advantages will become more readily apparent from the following description and the accompanying illustrative drawings in which:

Figure 1 is a side elevational view of my improved cradle,

Figure 2 is a top plan view thereof,

Figure 3 is a detail of a coupling,

Figure 4 is a sectional detail of an eccentric, and

Figure 5 is a similar view of a transmission.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

In the accompanying drawings, and in the following specification, the same reference characters are used to designate the same parts and elements throughout and in which 10, refers to my invention in its entirety and 11, indicates a bedstead and 12, a supporting frame therefor.

To the outer surfaces 13 and 14, of the side rails 15 and 16, of the frame 12, are pivotally connected hangers 17, 18, 19 and 20, the lower ends 21, 22, 23 and 24, of which are pivotally connected to the lower terminals 25, 26, etc., of the legs 27, 28, 29 and 30, of the cradle 11.

The legs 31, 32, 33 and 34, of the frame 12, are of a length to permit the cradle legs to move freely without contacting the floor upon which the frame seats. Attached to the side rails 35 and 36, of the cradle are the terminal ends 37 and 38, of a cross bar 39, adjacent the head 40, of the crib. Fixed centrally of bar 39, is an arm 41, the end 42, of which terminates in a ball socket 43, in which seats the ball 44, of the vertical end 45, of the forward section 46, of a connecting rod 47. The end 48, of rod 46, is enlarged and provided with an internal threaded bore into which is adjustably screwed the threaded end 49, of section 50, of the rod 47.

Mounted upon a cross bar 50', the ends 51 and 52, of which are fixed to the rails 15 and 16, of frame 12, is a motor 53, to which is connected a transmission case 54, into which projects the motor shaft 55, provided with a worm 56, meshed with a worm gear 57, fixedly mounted upon a vertical shaft 58, the upper end 59, of which projects through the top wall 60, of case 54, and above the upper surface 61, of the motor 53, in order that the eccentric arm 62, may operate over the motor. Said arm 62, is provided with a bore 63, into which the terminal 64, of shaft end 59, projects and which is held fixed by a set screw 65. Screwthreaded into bore 66, of the free end 67, of said member 62, is the end 68, of a link 69, provided with an enlarged outer end 70, having a vertical bore 71, within which is seated a ball race 72, for balls 73, and through the center member 74, of which is projected a bolt 75, on the upper end 76, of which is seated the bored terminal 77, of the rod 50, and a member 78 on member 74 being a spacer and secured by a nut 80.

The motor speed, of course, is reduced by the gear 57, for a proper movement of the cradle and the length of the movement of which may be adjusted by the screw connections 48 and 68, and adjustment of bar 39, on the rails 35 and 36, by clamp nuts 81 and 82, or alternatively, the cross bar 50' may be adjustably mounted upon the rails 15 and 16.

From the foregoing it will be seen that I have provided an electrically operated cradle having swing motion from head to foot and a slight up and down motion and without moving the bed of the cradle from the horizontal, whereby an infant will not be shaken up in the movement of the cradle, which disturbing movement is really harmful to an infant as contended by some baby specialists.

Having now described my invention, that which I claim as new and desire to procure by Letters Patent is:

A device of the character described including a rectangular supporting frame, depending supporting legs disposed in the corners thereof, depending hangers having inwardly extending supporting terminals on their upper ends pivotally supported in said frame and outwardly extending supporting terminals on their lower ends, a crib including a frame disposed above said supporting frame and extending beyond the opposite sides and ends thereof, depending legs on said crib pivotally supported by the lower end terminals of said hangers, a fixed connection on said crib, an electric motor on said supporting frame, a gear reduction mechanism operatively connected therewith, an eccentric arm connected with said gear reduction mechanism, an extensible connecting rod between said eccentric arm and said fixed connection on said crib, and a ball and socket connection between said rod and said fixed connection.

BAXTER S. CARRUTH.

REFERENCES CITED

The following references are of record in the file of this patent:

UNITED STATES PATENTS

| Number | Name | Date |
|---|---|---|
| 1,500,009 | Smaldone | July 1, 1924 |
| 1,727,635 | Crane | Sept. 10, 1929 |
| 1,920,687 | Fleacca | Aug. 1, 1933 |

FOREIGN PATENTS

| Number | Country | Date |
|---|---|---|
| 16,308 | Austria | May 25, 1904 |
| 314,537 | Italy | Jan. 30, 1934 |